United States Patent [19]

Decker et al.

[11] Patent Number: 4,764,669

[45] Date of Patent: Aug. 16, 1988

[54] PHOTOELECTRIC APPARATUS FOR TRACING A SCANNING HEAD ALONG A PATTERN TRACK WITH SELECTABLE SAMPLING

[75] Inventors: Klaus Decker, Rosbach; Ivan Polacek, Hanau, both of Fed. Rep. of Germany

[73] Assignee: ESAB - HANCOCK GmbH, Fed. Rep. of Germany

[21] Appl. No.: 826,934

[22] Filed: Feb. 6, 1986

[30] Foreign Application Priority Data

Feb. 18, 1985 [DE] Fed. Rep. of Germany ....... 3505525

[51] Int. Cl.$^4$ ................................................ G05B 1/00
[52] U.S. Cl. ..................................... 250/202; 250/578; 318/577
[58] Field of Search ................ 250/202, 578; 318/577, 318/640; 358/96, 107

[56] References Cited

U.S. PATENT DOCUMENTS

| | | | |
|---|---|---|---|
| 4,319,331 | 3/1982 | Elbaum et al. | 250/202 |
| 4,561,061 | 12/1985 | Sakamoto et al. | 250/202 |
| 4,613,749 | 9/1986 | Vali | 250/202 |

Primary Examiner—David C. Nelms
Assistant Examiner—Jessica L. Ruoff
Attorney, Agent, or Firm—Andrew J. Cornelius; William A. Behare; Alan P. Kass

[57] ABSTRACT

In a photoelectric apparatus for tracing a scanning head (8) along a pattern track (13), a constant arrangement (17) of tightly spaced light-sensitive elements (16) is provided in the scanning head forming together with an addressing device (25) scanning patterns (14) which can be sampled. On the arrangement of the light-sensitive elements, a section of a pattern plane for scanning including an essential transversal component of the scanning pattern is imaged. From illumination state signals of the sampled light-sensitive elements, control signals are generated by means of an evaluation device (28, 31, 32), controlling the tracing movement of the scanning head in two movement directions (4, 5) rectangularly oriented relative to each other. The shape and/or the position of the scanning pattern (14) in the scanning head scanning the pattern track (13) may be varied by selective sampling of determined light-sensitive elements from a greater number of light-sensitive elements (16) provided in the constant area-like arrangement (17).

12 Claims, 3 Drawing Sheets

PHOTOELECTRIC APPARATUS FOR TRACING A SCANNING HEAD ALONG A PATTERN TRACK WITH SELECTABLE SAMPLING

The invention relates to a photoelectric apparatus for tracing a scanning head along a pattern track as in accordance with the preamble of claim 1.

Such photoelectric apparatus may for instance be provided for controlling a processing machine processing a workpiece in accordance with a photoelectrically scanning drawing pattern. In particular, a burner carriage of an acetylene burner may be moved in coordinate directions rectangularly oriented relative to each other. In the framework of a plurality of further application possibilities it is however also conceivable to employ a scanning head which scanningly traces a drawing pattern comprising lines or silhouettes for measuring the lines or areas.

In order to avoid the disadvantages of a highly sophisticated and complicated construction of a photoelectric apparatus comprising a circularly rotating optical element, a lens or a concave mirror, electromagnetically driven by a so-called sine-cosine coil, photoelectric apparatus of the above mentioned kind have already been known operating without the use of continuously circulating optical elements in the scanning head. In detail, such prior art photoelectric device includes a circular array of light-sensitive elements upon which a section of a pattern plane is projected by means of an optical system which is stationary relative to the light-sensitive elements (U.S. Pat. No. 4,160,199). By means of the evaluation circuit connected to the circularly arranged tightly spaced light-sensitive elements, it is found out under which angle the scanning pattern is cut from the scanning line, or contour, respectively. From a sine function and a cosine function of this angle, signals for the control of motors are formed, which trace the scanning head in two directions at right angles relative to each other along the scanned pattern track. To this effect, all light-sensitive elements of the circular, or annular, respectively, array are successively sampled. The time difference between the sampling of a fixed reference point of the circular array of the light-sensitive elements and the light-sensitive element respectively darkened by the pattern track, is stored in a scan angle register as the measure of the angle under which the circular array of the elements is cut from the pattern track. The output voltages of a sine wave generator and of the scan angle register are processed to generate two voltages one voltage of which is proportional to the sine of the scan angle and drives the drive motor for the X axis while the other voltage is proportional to the cosine of the scan angle and feeds the drive motor for the Y axis. As concerns the initial adjustment of the scanning head relative to the pattern track which should automatically be followed, an intercept circuit has in this connection been known essentially consisting in that by means of one of a plurality of manually operable switches the scan angle register is so reset that its contents corresponds to a desired direction of movement, for instance in the direction of the X axis to the right. The switches are turned inactive as soon as the array of the light-sensistive elements covers the pattern track which is then followed. Switch-over of the configuration of the light-sensitive elements in the array is not provided for. The prior art system may furtheron be provided with compensation or balancing circuits to consider the width of the pattern track and/or the width of a tool which is controlled by the system. To this effect, a scan register successively sampling the circularly arranged light-sensitive elements in order to feed the sampling result into the scan angle register is pre-adjusted. Pre-adjustment is made on the base of a guess of the pattern track width which may for instance cover two light-sensitive elements. The sequential sampling of all light-sensitive elements of the stationary area-type array in the circle however remains unchanged. This applies also for an automatic compensation of the pattern track width by means of a circuit arrangement evaluating the output signals of the annular array of the light-sensitive elements. In this way, however, only a limited improvement of the scan, or the processing of the tool controlled as a function of the scan, in a direction at right angles relative to the pattern track is possible.

The state of the art, furtheron, also includes a photoelectric apparatus for tracing a scanning head along a pattern track essentially corresponding to the above-referenced kind without an addressing device though, wherein the light-sensitive elements in various embodiments of the device may in various ways stationarily be arranged one next to the other. In particular, a plurality of photocells of substantially equal effective area are so arranged in adjacent juxtaposed positions that the pattern track is scanned with a substantial transversal component. Instead of the rectilinear-serial arrangement, the light-sensitive elements may be offset in the approximation of a section of a circular arc (U.S. Pat. No. 3,852,590). The signals from each photocell of one arrangement are fed, in each case, in a determined way, to differential amplifiers the outputs of which, again, are combined in an adder curcuit.

The signals emitted by the photocells are thus so evaluated that derived signals are generated, which determine the direction and the measure of the deviation of the pattern track from the scanning pattern formed by the photocells in order to form therefrom control signals for driving the scanning head in two coordinate directions. The arrangement determined relative to each other of the light-sensitive elements may be rotated, together with the respective illumination system for the section of the pattern plane, around an axis by means of a scanning head motor. In this way, the arrangement of the photocells may be fed a shift in the forward direction of the tracing movement of the scanning head, which may be referred to as a forward offset or speed advance. Normally, in photoelectric apparatus for tracing a scanning head along a pattern track, the speed advance is normally provided to retard in time the tracing movement with a view to the course of the pattern track covered by the scanning head, when the pattern track passes from a little-curved section into a section of a particular curvature or into an edge. This avoids that the scanning head and the tool coupled to it, if any, overshoots the range of the particularly strong curvature or the edge of the pattern track because of the restricted dynamic properties of the system, i.e. does not exactly follow the pattern track in this section. In case of a timely recognition of the section of a stronger curvature or of the edge, the scanning head may follow the pattern track without overshooting with reduced tracing speed. In this prior art photoelectric apparatus, therefore, the speed advance is mechanically generated by rotating the scanning head with the photocell configuration stationary within the scanning head. This rotation of the scanning head is relatively complicated with a view to the necessary scanning head steering motor and the transfer of the signals of the photocells via slide rings or similar current supply for the illumination device in the scanning head. In addition, the well-known disadvantages of slide rings have to be taken into consideration.

As concerns speed advance and tool transversal movement, i.e. the correction of the operating width of the tool (cutting slit), it has also been known to provide a scanning head of a photoelectric apparatus for tracing along a pattern track comprising an unchangeable array of light-sensitive elements in the scanning head rotatably around an excentric axis (U.S. Pat. No. 4,072,301). The precision-mechanical means to obtain this particular rotatability of the scanning head corresponding to two parameters, which includes a scanning head steering motor, is relatively complicated. In spite of the complicated arrangement, it is only the position of the scanning pattern formed by the photocell array which can be shifted while the shape of the scanning pattern remains fixed.

The prior art also includes an electric copying control apparatus for processing machines comprising a scanning head photoelectrically scanning a guiding section including a pattern track having a substantial transversal component, to which scanning head a control device is connected forming from the output signals of the scanning head control signals for the movement of the scanning head and of a tool connected thereto in the direction of the tangent to the pattern track (German Patent Specification No. 2,505,296). At the side of the guiding section, a particular code area including marks is provided on the pattern, which may be scanned by the scanning head separately from the guiding section. By scanning the code area, additional control commands for influencing the scanning head and/or the tool are generated. Laser or burner control, left-right information in two-way paths or crossings of the pattern track, tool exchange or speed switch over may additionally be controlled thereby. Scanning of the section of the pattern track is so effected that alternately and one after the other, the guiding section and the code areas are passed over and the output signals of the scanning head so obtained are evaluated in different switch steps of the control device. For the separate scanning of the guiding section and of the code area(s), diaphragms may be provided, which cover light-sensitive areas of the scanning head in correspondence with the guiding and code areas to be scanned. Instead of by the mechanical diaphragms provided in the scanning area, masking of the, respectively inactive, light sensitive areas may preferably be obtained electronically in the control device. The position and the shape of the scanning pattern scanning the pattern track remain unchanged in any case, and for the consideration of particular operation parameters in the copying control device, additional code areas including marks have to be provided on the pattern, which make the system substantially more complicated.

It is therefore the aim of the present invention to provide a photoelectric apparatus for tracing a scanning head along a pattern track of the kind mentioned above that it can freely be adapted, without the need of additional coding areas and marks on the pattern which would have to be scanned photoelectrically as well, in a non-complicated way to the operation parameters to be obeyed when tracing the scanning head, such as tool transversal movement, speed advance, change of the mode of operation ("Intercept" and "Follow"). In this way, a precise tracing of the scanning head and, if necessary, a correspondingly exact guidance of the tool can be promoted.

This problem is solved by the embodiment of the photoelectric apparatus of the kind mentioned in the beginning comprising the feature revealed in the characterizing clause of claim 1.

In accordance with the invention, the scanning pattern represented by the active light-sensitive elements of the scanning head and covering the pattern track, is freely changed in the shape and/or the position within the total area of the area arrangement of a greater plurality of light sensitive elements without the requirement of a corresponding mechanical adjustment of the scanning head, in which the light-sensitive elements are solidly secured. When using semiconductor chips, on which minutest light-sensitive elements are arranged in a plane, the shift of the scanning pattern can, in accordance with the invention, be effected by addressing the corresponding light-sensitive elements, delicately stepped and quasi-constantly, particularly in order to consider different tracing speeds for speed advance of the scanning pattern and/or different tool diameters for tool transversal movement. The shape of the desired scanning pattern, particularly closed or open circular rings can with comparatively little expense be exactly approximated. There is no need for the production of particular light-sensitive elements, rather may light-sensitive RAM chips or light-sensitive chips according to the CCD* principle as used in electronic image recording devices be used. The light-sensitive elements employed as in accordance with the present invention are preferably arranged grid-shaped in rows and columns in a plane. The light-sensitive total area is preferably rectangular.

*(Charge Coupled Device)

RAM chips are furtheron used by preference, on which the light-sensitive elements are formed. Each individual light-sensitive element, or each storage cell of the RAM chip may individually be directly addressed and sampled so that this process may without any complication be used for the different scanning patterns.

When using chips comprising CCD elements, sampling has to be made by a specific selection of the column (for instance all of them or three column each) of the light-sensitive elements in a specific sequence. In order to realise the individual exact scanning patterns with such chips, an additional storage is provided, in accordance with claim 4, conformally organized to the geometric arrangement of the light-sensitive elements in a plane, and from the storage cells of which, again, the information may be sampled in a direct access, independently from whether the assigned light-sensitive element was exposed or was darkened by the pattern track.

The additional storage forms, together with a read logic via which the conformal image of the geometric arrangement of the light-sensitive elements in the additional storage is generated, an intermediate logic, which emits the output signals for further evaluation.

The addressing device provided in connection with the light-sensitive elements as scanning pattern generator generates a sequence of addresses, corresponding to the scanning pattern, of the light-sensitive elements in the area-type arrangement by which the light-sensitive elements or storage cells of the conformal storage may directly be sampled.

For the evaluation of the sequential output signals generated by the sampling of the light-sensitive elements or of the conformal storage, the former may be subjected to a mean value formation, from the result of which, in a manner known per se, the position of the pattern track (line strong point) or of the edge of a scanned area may be deducted. The mean value former thus belongs to an evaluation device, which furtheron, includes circuit arrangements for direction recognition and for the formation of a track vector, on which the scanning head is to be traced. From the components of the track vector, nominal value signals are, to this end, furtheron formed for the speed of two drive systems, which perform, in two moving directions, rectangularly oriented relative to each other, the tracing movement of the scanning head and of a tool coupled thereto, if necessary. The tracing speed depends on the size of the track vector.

An important aspect of the present invention is seen in that, in the apparatus of the invention, the shift of the scanning pattern in the direction of the tracing movement for the speed advance and/or transversally to the tracing movement for the tool transversal shift, when using the apparatus for controlling a processing machine is done by selection of the sampling of the light-sensitive elements from the greater number in the constant area-like arrangement spaced in a distance corresponding to the shift relative to the light-sensitive elements, which form a scanning standard pattern. By scanning standard pattern, that scanning pattern formed by the light-sensitive elements is to be understood, which neither yields a speed advance nor a tool transversal shift. In case of the scanning standard pattern, a defined point of the scanning pattern, or of the curve generated forming the scanning pattern, coincides with the working point. The working point in this connection constitutes that point in which the centre of the processing tool is, which may be coupled to the scanning head. The particular advantage of this apparatus is seen in that not either the speed advance or the tool transversal shift, but rather both shifts may at the same time variably be adjusted without requiring any complications, particularly for precision-mechanical adjustment means of the scanning head.

By the further embodiment of the photoelectric apparatus according to claim 8 it is reached that the active light-sensitive elements of the scanning head will, in any of the transportation directions changing in case of non-rectilinear pattern tracks, scan the pattern track in advance at a predetermined speed advance, and will scan the pattern track from the side at always the same predetermined distance of the lateral shift. The scanning head steering motor, which rotates the scanning head about an axis perpendicular to the pattern track so that the scanning head is always turned about the same angle relative to the track vector in the direction of which the scanning head has to be moved so that the scanning head and the tool controlled by it follow the pattern track, is no longer needed. In other words, the scanning pattern shift logic is, in accordance with the invention, parametrized as in accordance with the track vector. Because the scanning pattern shift logic is so formed that the scanning pattern will, if possible, cut the pattern track transversally independently from the position of the track vector, relatively few active light-sensitive elements will do to form the scanning pattern for safe tracing. The scanning speed may thereby be raised.

For the adjustable tool transversal shift of a processing machine controlled by the photoelectric apparatus, a tool radius date may be fed into the scanning pattern shift logic.

The photoelectric apparatus may with particular advantage, according to claim 10, be adjusted, by the addressing device which is formed as scanning pattern and which may be switched over by a mode of operation selector, according to the mode of operation, to a scanning pattern adapted thereto. In this way, scanning may be optimized, by simple means, for all modes of operation.

In particular, the addressing device formed as scanning pattern generator for the generation of a complete circle the centre of which is advanced for at least the tool radius in the direction of travel of the scanning head may, according to claim 11, adjust "Intercept" during the course of the mode of operation. In this mode of operation, the scanning head advances rectilinearly first through a further control which may, in particular, manually be adjusted, towards the pattern track, or a contour, respectively. The complete circle as the scanning pattern guarantees that the pattern track is safely covered. As soon as this is effected, one may switch over to the "Follow" mode of operation. In this mode of operation, to raise the scanning frequency or scanning speed, only a partial circle is employed as scanning pattern, which is sufficient to recognize the track pattern. This partial circle may have such a short arch that it projects only at the two sides safely beyond the width of the pattern track even if the pattern track is curved.

In the further embodiment of the photoelectric apparatus according to claim 12, the addressing device formed as scanning pattern generator is so dimensioned that it can generate, time-shifted, two scanning patterns one after the other. The first scanning pattern serves for tracing the scanning head in the direction of the track vector while the second scanning pattern, caused by a transversal control, keeps the actual working point exactly on the scanning pattern track although the preceding first scanning pattern would cause, with a view to the curvature of the pattern track, a variable lateral offset of the working point.

In the following, an exemplified embodiment of the invention will be explained in more detail based on a drawing comprising three figures.

Figure 1:
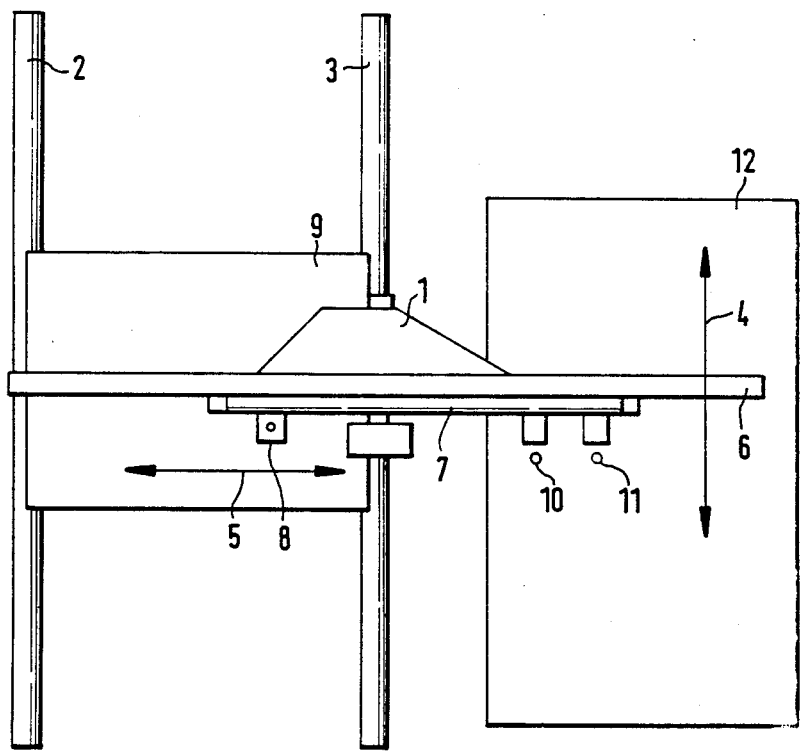
FIG. 1 is a top view on one part of a processing machine, especially a flame cutting machine including two burners as the tools which are controlled by a scanning head in two coordinate directions perpendicular relative to each other.

FIG. 1 shows, schematically, as an applied example of the photoelectric apparatus for tracing, in a top view, a portion of a flame cutting machine. A machine carriage comprises a longitudinal carriage 1 movable on running and guiding tracks 2, 3 in longitudinal direction—double arrow 4. In the transversal direction—double arrow 5—a transversal carriage 7 may be moved on an outrigger 6 of the longitudinal carriage.

For driving the longitudinal carriage and the transversal carriage, a drive system each not shown in the drawing is employed.

The transversal carriage carries a scanning head 8 over a pattern plane or scanning area 9. The tools 10, 11, in the present case burners, rigidly anchored to the scanning head on the transversal carriage, are guided over a working area 12 to cut, for instance sheet metal corresponding to a pattern track of the scanning area 9.

Figure 2:
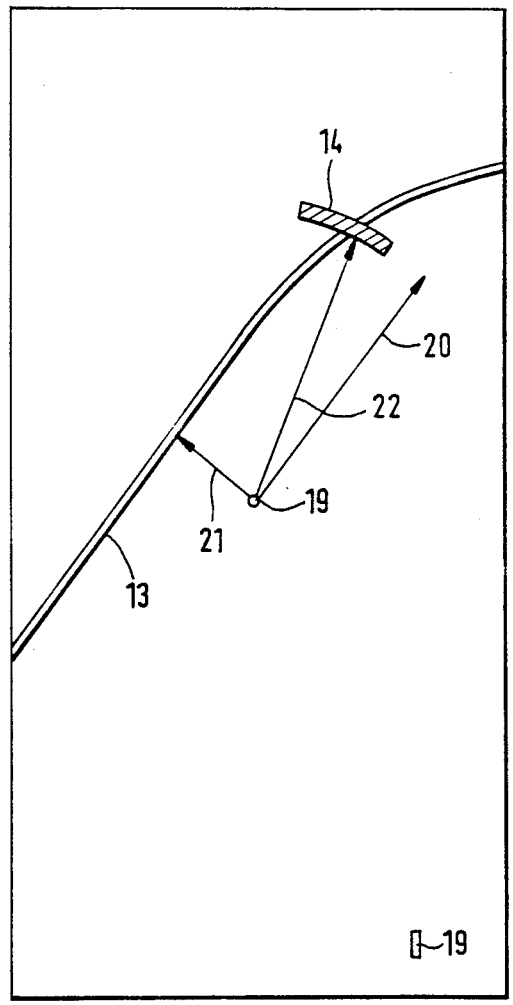
FIG. 2 is a section of a pattern plane including a pattern track which is scanned for the control of the tools according to FIG. 1.

FIG. 2 shows a section of the pattern plane including a pattern track 13. The pattern track is photoelectrically scanned by a scanning pattern, or a curve 14 generated in the scanning head, respectively. To this end, the section of the pattern plane is illuminated by an illumination device in the scanning head and the image of the pattern track of the section is imaged via an optical system 15—compare FIG. 3—into an image plane including a number of light-sensitive elements 16 raster-shapedly arranged in columns and rows. The rectangular, area-type arrangement of the light-sensitive elements is generally referred to by 17.

The curve generated in FIG. 2 and referred to as 14 corresponds to activated light-sensitive elements in the arrangement 17. "Activated" in this connection means that the data formed by the light-sensitive elements of the illumination state of these elements are sampled and further processed.

In FIG. 2 there is furtheron shown the projection of an individual light-sensitive element in the pattern plane referred to by 18. The scanning pattern or the generated curve 14 is thus approximated by means of such adjacent light-sensitive elements which are activated.

From FIG. 2, it can furtheron be taken that a working point 19, on which the scanning head 8, or the tools 10, 11, respectively, are adjusted when scanning the pattern track 13 with the scanning pattern 14, is shifted about an advance 20 of the scanning pattern in the transport direction or the tracing direction, respectively, as well as about a transversal shift 21, which corresponds to the tool radius or the burner radius, respectively. The advance is also referred to as the speed advance and the transversal shift is referred to as tool transversal shift. From the advance and the transversal shift, there results a shift vector 22 emanating from the working point 19 and leading to the section of the scanning pattern 14 with the pattern track 13. A track vector on which the scanning head has to be moved to enable it as well as the tools coupled thereto to follow the pattern track has the direction of the transport direction advance 20 and an amount equal to the tracing speed.

Figure 3:
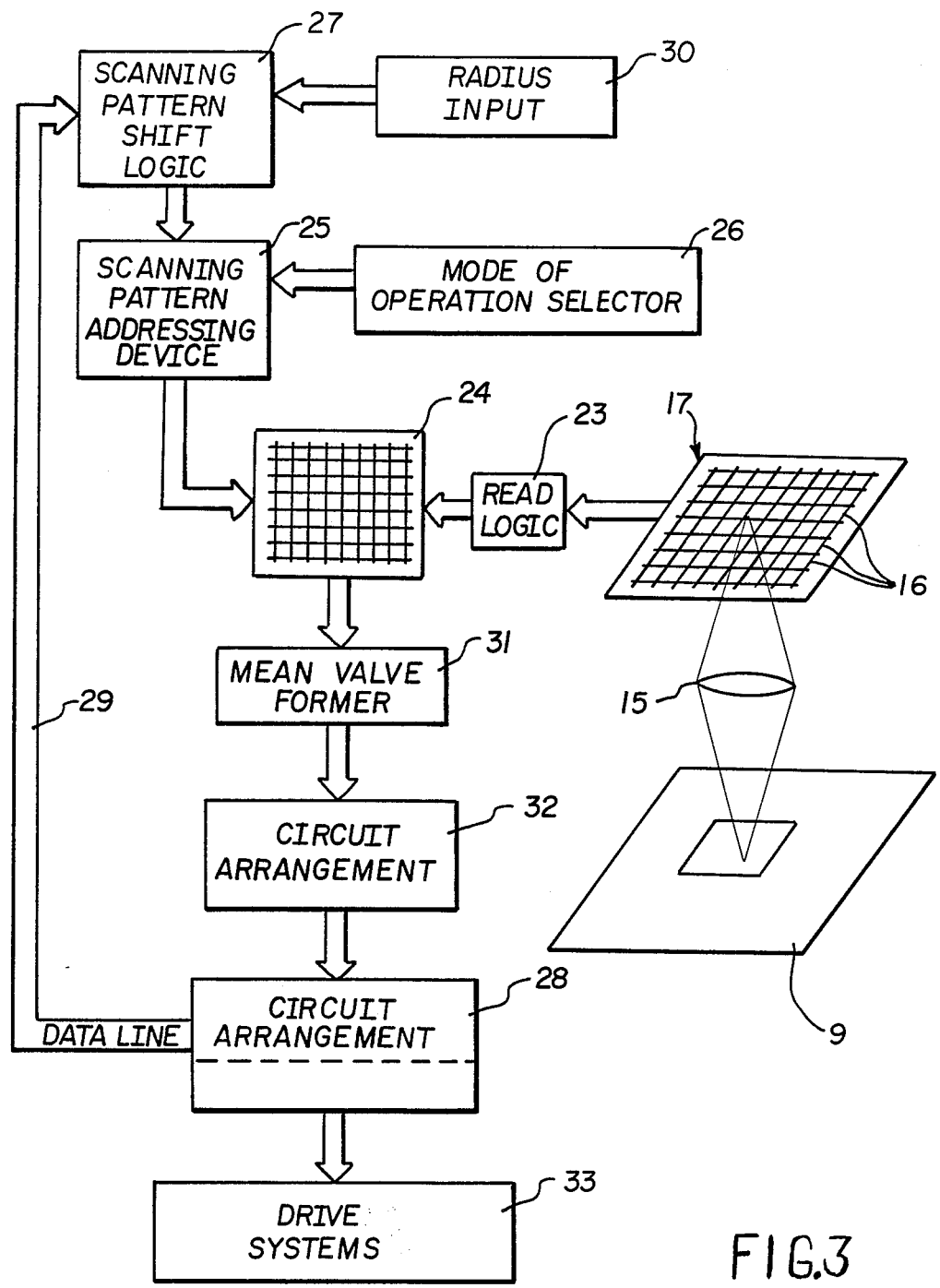
FIG. 3 is a schematic view of the photoelectric apparatus for tracing a scanning head according to the pattern track and the tools coupled to the scanning head.

As already mentioned, the scanning pattern 14 having the area arrangement 17 of the light-sensitive elements 16 arranged in columns and rows is generated as far as they are activated. The arrangement of the light-sensitive elements may be part of a RAM chip. In FIG. 3, however, it is assumed that the light-sensitive elements are so-called CCD* elements as are typically employed in chips used for video cameras and which may electronically be sampled as to whether or not during the course of a period of time light has fallen on the respective element. Because the CCD elements cannot, normally, directly and individually be sampled, the data of all the light-sensitive CCD elements are transferred via a read logic 23 into a so-called raster storage 24. The raster storage is organized conformally to the raster-shaped area-like arrangement of the light-sensitive elements of the area arrangement 17; all the storage cells of the raster storage, however, may individually be sampled.

*(Charge Coupled Device)

The shape of the scanning pattern 14 in FIG. 2 as well as its advance in the transport direction 20 and the transversal shift 21 are generated in that only a corresponding selection of determined storage cells of the raster storage are sampled for the processing of the data for the illumination state, stored in it, of the assigned light-sensitive elements for further evaluation. To this end, the storage cells are sampled by a scanning pattern addressing device 25. The scanning pattern addressing device 25 forms, to this end, the address sequence for the storage cells, the light-sensitive elements of which are on the desired scanning curve, which one may imagine as projected in the pattern plane corresponding to the generated curve 14 in FIG. 2. The curve generator may include a correction of the optical system and may consider the rectangular shape, rather than the ideally desired square shape, of the light-sensitive elements arranged one next to the other.

The shape of the scanning pattern may be predetermined by means of a mode of operation selector 26, which effects the scanning pattern addressing device 25. By this means, a complete circle may particularly be adjusted as the scanning pattern in the "Intercept" mode of operation, the centre of which is advanced for at least one tool radius in the direction of travel. In the "Intercept" mode of operation, the scanning head travels rectilinearly towards the pattern track 13 until the pattern track is covered. By means of the mode of operation selector one may, if necessary, subsequently automatically switch over to the "Follow" mode of operation. In this mode of operation, by means of the scanning pattern addressing device a sufficiently broad partial circle is generated by means of which, in the tracing movement of the scanning head, the pattern track is safely covered in order to further control the tracing movement. With a view to the relatively short arch of the partial circle, the scanning frequency may be increased.

The shift of a scanning pattern in the transport direction as advance 20 and the transversal shift corresponding to the tool radius is initiated by a scanning pattern shift logic 27, which controls the scanning pattern addressing device. In order to obtain the shift of the scanning pattern, which should preferably cut the pattern track in transversal direction, for all movements of the pattern track, the scanning pattern shift logic may be controlled by the track vector, which is formed together with an evaluation device from the sampled storage cells of the raster storage 24. For this control, one output of a circuit arrangement 28 for the formation of the track vector via a data line 29 is connected to one input of the scanning pattern shift logic 27. Into a second input of the scanning pattern shift logic, a date from the tool radius input 30 may be fed.

The evaluation device includes a mean value former 31 fed by outputs of the raster storage, and controlling a circuit arrangement 32 for the recognition of the direciton for the tracing movement as well as the circuit arrangement for the formation of the track vector 28. The track vector includes in addition to the direction of the tracing movement also the amount of the tracing speed. The circuit arrangement 28 includes furtheron a nominal value former for the speeds, by which the drive systems—block 33—transport the tools in the longitudinal direction and in the transversal direction in order to follow the scanning head and the tools on the pattern track.

What is claimed is:

1. In photoelectric apparatus for tracing a scanning head along a pattern track in a pattern plane a section of which is imaged onto a constant array of tightly spaced light-sensitive elements, which form a scanning pattern to be sampled by means of an addressing device, including an evaluation device by which control signals are generated from the exposure status signals of said sampled light-sensitive elements controlling the tracing movement of said scanning head in two movement directions particularly rectangularly oriented relative to each other, the improvement comprising that the shape and/or position of said scanning pattern in said scanning head scanning the pattern track is variable by selectable sampling of particular ones of said light-sensitive elements from a larger number of said light-sensitive elements in the constant array.

2. Photoelectric apparatus according to claim 1, wherein said light-sensitive elements are arranged in a plane, grid-shaped in columns and rows.

3. Photoelectric apparatus according to claims 1 or 2, wherein said light-sensitive elements are cells of a RAM chip.

4. Photoelectric apparatus according to claims 1 or 2, further comprising a raster storage organized conformally with the geometric arrangement connected to said array of said light-sensitive elements, from which the exposure status data of the selected of said light-sensitive elements are directly sampled.

5. Photoelectric apparatus according to claim 4, further comprising read logic inserted between said light-sensitive elements of said array and said raster storage that generates a conformal storage in which the conformal image of said array of said light-sensitive elements is stored.

6. Photoelectric apparatus according to claim 5, further comprising an addressing device formed as scanning pattern generator, which generates a sequence of addresses of said light-sensitive elements corresponding to said scanning pattern in said array, by which addresses of said light-sensitive elements of said conformal storage are directly sampled.

7. Photoelectric apparatus according to claim 1, further comprising means for shifting said scanning pattern in the direction of the tracing movement and/or transversal relative to the tracing movement for a speed advance displacement and/or tool transversal displacement for the control of a processing machine, and wherein said displacement is obtained by selecting the sampling of said light-sensitive elements from the greater number in said array spaced in a distance corresponding to the displacement relative to said light-sensitive elements which form a scanning standard pattern.

8. Photoelectric apparatus according to claim 6, further comprising an evaluation device forming, from the exposure status signals of the sampled of said light-sensitive elements, signals of a respective track vector, on which the tracing movement of said scanning head takes place, the amount of the track vector corresponding to the tracing speed, wherein an output of said evaluation device emitting the signals of the track vector is connected via scanning pattern shift logic to said addressing device formed as scanning pattern generator, said scanning pattern shift logic being so designed that said scanning pattern crosses the pattern track, at least approximately, in transversal direction.

9. Photoelectric apparatus according to claim 8, wherein said scanning pattern shift logic is adapted to receive a tool radius date for the tool transversal displacement of a processing machine controlled by said photoelectric apparatus.

10. Photoelectric apparatus according to claim 6, further comprising a mode of operation selector for switching over to various scanning patterns said addressing device formed as scanning pattern generator.

11. Photoelectric apparatus according to claim 10, wherein said addressing device formed as scanning pattern generator is adjustable, during the course of a mode of operation in which said scanning head detects the pattern track, for the generation of a complete circle the center of which is advanced for at least the tool radius in the travelling direction of said scanning head, and afterwards may be switched over to a mode of operation in which said scanning head follows the pattern track, in that said addressing device generates a partial circle scanning the pattern track and projecting approximately transversally on both sides beyond the pattern track.

12. Photoelectric apparatus according to claim 11, wherein said addressing device formed as scanning pattern generator is so expanded that it generates in addition to a first scanning pattern advanced in the tracing direction a second scanning pattern, in time-shifted relation, crossing the pattern track in an actual working point.

* * * * *